(12) United States Patent
Lu (10) Patent No.: US 9,352,259 B2
(45) Date of Patent: May 31, 2016

(54) SYSTEM, METHOD AND DEVICES FOR AIR FILTRATION

(76) Inventor: Jing Lu, Atlanta, GA (US)

( * ) Notice: Subject to any disclaimer, the term of this patent is extended or adjusted under 35 U.S.C. 154(b) by 0 days.

(21) Appl. No.: 13/610,817

(22) Filed: Sep. 11, 2012

(65) Prior Publication Data

US 2013/0000489 A1    Jan. 3, 2013

Related U.S. Application Data

(63) Continuation-in-part of application No. 12/901,409, filed on Oct. 8, 2010, now Pat. No. 8,510,527.

(51) Int. Cl.
*B01D 39/00* (2006.01)
*B01D 46/00* (2006.01)
*B01D 46/10* (2006.01)

(52) U.S. Cl.
CPC ........ *B01D 46/0005* (2013.01); *B01D 46/0038* (2013.01); *B01D 46/10* (2013.01)

(58) Field of Classification Search
USPC ...................... 96/222, 416; 55/495, 497, 499, 55/500–501, DIG. 5, DIG. 31; 95/273
See application file for complete search history.

(56) References Cited

U.S. PATENT DOCUMENTS

| | | | | |
|---|---|---|---|---|
| 2,393,419 A * | 1/1946 | Schaaf | ............................. | 52/658 |
| 2,575,499 A * | 11/1951 | Manow | ............................ | 55/422 |
| 3,698,308 A * | 10/1972 | Navara | ........................... | 454/213 |
| 5,176,576 A * | 1/1993 | Moulindt | ....................... | 464/111 |
| 6,986,799 B2 * | 1/2006 | Ham | ................................ | 55/521 |
| 8,172,919 B1 * | 5/2012 | Ruiz et al. | ........................ | 55/495 |
| 2004/0182055 A1* | 9/2004 | Wynn | ................................ | 55/497 |
| 2006/0005711 A1* | 1/2006 | Olefson | .......................... | 96/222 |
| 2011/0030557 A1* | 2/2011 | Brownstein et al. | ............. | 95/273 |

* cited by examiner

*Primary Examiner* — Jason M Greene
*Assistant Examiner* — Karla Hawkins
(74) *Attorney, Agent, or Firm* — Crose Law LLC; Bradley D. Crose (57) ABSTRACT

An air filter assembly is disclosed. The air filter assembly is comprised of a frame consisting of two sections configured for releasable holding of a recyclable filter material. The air filter assembly is further comprised of a fragrance contained in a container configured to passively release the fragrance during air flow. The air filter assembly is further comprised of at least one compartment for securely holding the fragrance container.

3 Claims, 10 Drawing Sheets

| TEST RESULTS - see attached performance curves | | |
|---|---|---|
| Test Airflow Rate | 667 | ft³/min (cfm) |
| Initial Resistance | 0.70 | in. w.g. |
| Final Resistance | 1.50 | in. w.g. |
| Initial Atmospheric Dust Spot Efficiency | 13.3 | % |
| Average Atmospheric Dust Spot Efficiency | 19 | % |
| Average ASHRAE Dust Weight Arrestance | 91 | % |
| ASHRAE Dust Holding Capacity | 95 | g |
| Test Section Duct Size | 20.0 x 20.0 | in |
| Test Dust | ASHRAE | |
| Test Dust Feed Rate | 2.0 | g/1000 ft³ |

SYSTEM, METHOD AND DEVICES FOR AIR FILTRATION

The present application claims the benefit of and is a continuation-in-part of U.S. application Ser. No. 12/501,409, filed Jul. 11, 2009 and titled, Economic Air Filter For Household, later updated to ECO-SAFE HOUSEHOLD AIR FILTER, which is herein incorporated by reference in its entirety.

FIELD OF THE INVENTION

The technology described herein relates generally to air conditioning devices. In particular the technology described herein pertains to systems, methods and devices for recyclable air conditioning filters for window units and HVAC systems.

BACKGROUND OF THE INVENTION

Air conditioning is the process of altering the properties of air (primarily temperature and humidity) to more favorable conditions. More generally, air conditioning can refer to any form of technological cooling, heating, ventilation, or disinfection that modifies the condition of air.

An air conditioner is a major or home appliance, system, or mechanism designed to change the air temperature and humidity within an area (used for cooling and sometimes heating depending on the air properties at a given time). The cooling is typically done using a simple refrigeration cycle, but sometimes evaporation is used, commonly for comfort cooling in buildings and motor vehicles. In construction, a complete system of heating, ventilation and air conditioning is referred to as HVAC.

Room air conditioners come in two forms: unitary and packaged terminal PTAC systems. Unitary systems, the common one room air conditioners, sit in a window or wall opening, with interior controls. Interior air is cooled as a fan blows it over the evaporator. On the exterior the air is heated as a second fan blows it over the condenser. In this process, heat is drawn from the room and discharged to the environment. A large house or building may have several such units, permitting each room be cooled separately.

A particulate air filter is a device composed of fibrous materials which removes solid particulates such as dust, pollen, mold, and bacteria from the air. A chemical air filter consists of an absorbent or catalyst for the removal of airborne molecular contaminants such as volatile organic compounds or ozone. Air filters are used in applications where air quality is important, notably in building ventilation systems and in engines.

Air cleaning and filtration is an important factor of our indoor environment because cleaning the air filters out what the lungs cannot by removing particles, contaminants, vapors and gases from the air. The filtered and cleaned air then is used in heating, ventilation and air conditioning. Air cleaning and filtration should be taken in account when protecting our building environments.

Air filters currently being sold consist of metal wire net that is glued together with non-woven filtering fibers installed in a paper cardboard frame. This assembly is not recyclable due to its mixture of components. The glass fibers and the metal net do not quickly decompose in a landfill.

An additional problem is balancing filtration efficiency with air flow level. Today's market demands that pollen, pet dander, spores, etc. be significantly reduced with little degradation of air flow levels for those suffering from air quality related allergies.

In countries with aggressive industrial expansion, air quality is a serious concern. According to the World Bank 16 of the world's 20 cities with the worst air are in China. According to Chinese government sources, about a fifth of urban Chinese breath heavily polluted air. Many places smell like high-sulfur coal and leaded gasoline.

China's smog-filled cities are ringed with heavy industry, metal smelters, and coal-fired power plants, all critical to keeping the fast-growing economy going even as they spew tons of carbon, metals, gases, and soot into the air. The air pollution and smog in Beijing and Shanghai are sometimes so bad that the airports are shut down because of poor visibility. The air quality of Beijing is 16 times worse than New York City.

In developing countries, window air conditioners are common, and fail to adequately filter out pollutants. Current window unit air filter assemblies do not adequately address the dual problems of recyclability and air quality.

These and other problems need to be addressed.

Related patents and published patent applications known in the background art include the following:

U.S. Pat. No. 2,393,419, issued to Schaaf on Jan. 22, 1946, discloses a frame for filters.

U.S. Pat. No. 2,575,499, issued to Manow on Nov. 20, 1951, discloses a removable fiber glass filter.

U.S. Pat. No. 3,698,308, issued to Navara on Oct. 17, 1972, discloses a window filter system providing filter means positionable in window frames adjacent opened windows for providing a cooling air flow to the associated room. Filter units are provided at both the top and bottom of the window frame to provide air circulation. The system is a passive system in that no mechanical parts are utilized for blowing air in or out of the room.

U.S. Pat. No. 5,176,570, issued to Liedl on Jan. 5, 1993, discloses a filtered cold air return register particularly for base board units which provides for a removable replacement filter section in combination with the normally provided duct covering or end section. The unit provides a filter device for the return air prior to its recycling by the furnace or air conditioning fan.

U.S. Pat. No. 6,986,799, issued to Ham on Jan. 17, 2006, discloses an air filter comprising an elastomeric flange member and a filter member mounted therein. The flange member has opposing ends and sides that define a central opening and protruding members integrally formed with the flange member and extending therefrom. The protruding members have opposed inwardly facing faces. The filter member has filter ends and sides and the filter sides are attached to the opposed faces in an insert molding process or via bonding of the filter sides to the respective faces.

U.S. Pat. No. 8,172,919, issued to Ruiz et al. on May 8, 2012, discloses a window filter apparatus which provides a framework for holding filters within the frame of windows, thereby offering filtered outside air for a building, without having to run an air conditioner. The apparatus further provides for filtering noise and light by the same filters. Box fans are ideal companions for the apparatus for drawing additional outside air into a building. No additional hardware or tools are needed. There is no invasion of windows or window frames.

U.S. Published Patent Application 2004/0182055, inventor Wynn, published on Sep. 23, 2004, discloses a collapsible expandable air filter assembly which includes an expandable pleated filter media, a filter frame made from a cardboard blank that is pre-scored, slit, creased and die cut to define a central area enabling air passage therethrough, and side and end panels foldable to positions generally normal to the central area to form a perimeter wall about the central area to receive and support the expanded air filter media. A filter grill is formed from a cardboard blank and has an open central area and laterally opposite marginal side and end walls foldable to enable mounting on the filter frame to assist in retaining the filter media within the filter frame. Separating fingers are formed integral with or separate from but connectable to the filter grill and are adopted to be positioned between adjacent expandable pleats to evenly position and secure the filter pleats. The filter frame and filter grill are foldable into compact folded positions of substantially similar size to the collapsed pleated air filter media to enable compact stacking and insertion into a carton for shipping and storage as a kit before assembly. Alternative collapsible disposable air filter embodiments utilize similar expandable pleated filter media but employ filter frames formed from pairs of panel frame members adapted to have their free ends interconnected to form a rectangular frame that receives the expanded filter media, but can be collapsed for stacking with the collapsed pleated filter media and inserted into a carton for shipping and storage as a kit prior to assembly.

U.S. Published Patent Application 2006/0005711, inventor Olefson, published on Jan. 16, 2006, discloses a replaceable air filter for a vehicle air conditioning system which employs a pleated, porous filter media coated with a perfume polymer composition to impart a long-lasting scent to air passing through the filter. In alternative embodiments of the invention the perfume/polymer composition is contained in a sheet overlying the filter material, in the frame or in a bead supported by the filter.

U.S. Published Patent Application 2011/0030557, inventor Brownstein et al., published on Feb. 10, 2011, discloses a non-woven textile based filter media which is produced from polyester fiber generated using recycled polyethylene terephthalate (PET) beverage bottles, and that non-woven textile based filter media is used to make an air filter. By controlling the diameters and lengths of the PET derived polyester fibers, a non-woven textile based filter media that exhibits a natural Minimum Efficiency Reporting Value (MERV) of about 8 (without requiring electrostatic treatment) and a pressure drop of 2.9 PSI or less can be achieved. A related exemplary embodiment is an air filter fabricated entirely from recycled materials, including a recycled cardboard frame, the non-woven textile based filter media made from recycled PET derived polyester fibers, and a support structure made of recycled plastic or metal wire.

U.S. Pat. Nos. 2,393,419, 2,575,499, 3,698,308, 5,176,570, 6,986,799, and 8,172,919, plus Published Patent Applications 2004/0182055, 2006/0005711 and 2011/0030557 are herein incorporated by reference in their entirety.

An air filter assembly that overcomes the numerous problems cited above is needed.

The foregoing patent, patent publication and non-patent information reflect the state of the art of which the inventor is aware and is tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

The technology described herein pertains to an air filter assembly configured for use with an air conditioning unit, e.g. a window unit, a residential HVAC system, a commercial HVAC system, as well as other air handling systems, the air filter element being recyclable and the remainder of the assembly being reusable.

The air filter sheet of the technology described herein is preferably 100% recyclable paper. Aspects of the air filter sheet are
   a. increased filtration capability,
   b. increased air flow capability and
   c. semi-clear color with sunlight shine though capability.

Embodiments utilizing the air filter sheet include, but are not limited to, a case design, a folding design, and a sandwich design with a re-usable frame.

The technology described herein is comprised of an encasement, e.g. a frame, for a recyclable air filter. In an exemplary embodiment the encasement is comprised of two frame sections. Each frame section is configured to snap-fit to its mating frame section, e.g. via male-female connections. Each section is further configured to have at least one internal fragrance retention area configured for holding a correspondingly dimensioned container of fragrance and/or odor control, e.g., a pouch, a stick, a sponge, a string, package, etc. The first section is configured to have each internal fragrance retention area at its bottom; the second section is configured to have each internal fragrance retention area at its top; thus allowing a user to place a fragrance container at either the top or bottom, or both. The frame is made of durable material, e.g. metal, plastic and is configured for reuse.

The technology described herein is further comprised of a recyclable air filter, configured to fit between the first frame section and the second frame section and to be secured between the first frame section and the second frame section when they are snap-fitted together. Once installed between the first frame section and the second frame section the air filter is configured to allow air flow from either direction, so there is no "right" or "wrong" way to insert the technology into air flow infrastructure, e.g. between the blower fan and the air delivery duct work.

The air filter is comprised of recyclable paper pulp filtration material configured for two-way filtration and to filter household dust, pollen, dust mites, mold spores, pet dander, smoke, smog, etc.

The air filter can be configured in an accordion, pleated shape or as a non-folded planar sheet.

In an exemplary embodiment the dimensions of the air filter sheet is 20 inches in height, 20 inches in length and 1 inch in depth with 21 pleats (folds).

In some embodiments the recyclable filtration material is derived from plant fibers, e.g. corn stocks, cotton stalks, grain stalks, tree branches.

The technology described herein is further comprised of at least on fragrance container, configured to fit in the internal fragrance retention area.

The technology described herein is further comprised to facilitate the fragrance from the fragrance container to be "pulled" from the fragrance container and carried with the air flow through the air delivery infrastructure without being filtered by the recyclable air filter. In other words the fragrance container is not directly in the path of strongest air flow from the blower fan. The fragrance can be in the form of a liquid, solid, gel, oil, etc.

In one embodiment of the technology described herein the at least one internal fragrance retention area is an array of internal fragrance retention areas. This facilitates a user increasing the strength of fragrance by inserting the desired number of fragrance packages. The array also facilitates a user customizing a desired fragrance by placing different types of fragrances in the internal fragrance retention areas.

In one embodiment of the technology described herein the at least one fragrance container contains a fragrance of one of the following fragrance groups:
a. Fruits
b. Nuts/Seeds/Grains
c. Spices
d. Flowers
e. Vegetables
f. Candy/Dessert
g. Mixtures of the above Examples include, but are not limited to:
a. Fruits: Apple, Banana, Lime, Bayberry, Blackberry, Cherry, Blueberry, Lemon, Orange, Pineapple, Grapefruit, Cranberry, Raspberry, Mango, Mulberry, Peach, Pear, Pomegranate, Red Current, Strawberry, Tangerine, Watermelon, Fig, Tomato, Apricot, Plum;
b. Nuts/Seeds/Grains: Almond, Coconut, Hazelnut, Brazil Nut, Pecan, Walnut, Sesame Seed, Wheat, Oats, Barley, Quinoa;
c. Spices: Anise, Cinnamon, Sage, Vanilla, All Spice, Mint, Clove, Basil, Ginger, Coriander, Nutmeg, Rosemary, Peppermint, Spearmint;
d. Flowers: Orchid, Rose, Eucalyptus, Lavender, Gardenia, Clover, Honeysuckle, Jasmine, Wisteria, Lilac, Magnolia;
e. Vegetables: Avocado, Cilantro, Cucumber, Olive, Sweet Pea;
f. Candy/Dessert: Chocolate, Angel Food Cake, Birthday Cake, Butterscotch, Candy Cane, Cappuccino, Coffee, Caramel, Carrot Cake, Chocolate Mint, Chai Latte, Gingerbread, Biscotti, Hot Fudge Sundae, Lemon Meringue, Maple Syrup, Oatmeal; Sweet Potato Pie, Vanilla Pound Cake;

In one embodiment the technology described each frame section is further comprised of a rubber edging around its periphery, the rubber edging configured for receiving a rubber elastic band configured for securing the first frame section to the second frame section, either in lieu or, or in combination with, a snap-fit configuration.

In another embodiment the technology described herein has a filter retaining lattice structure on the outside of the frame, either formed thereon or releasably attached.

In another embodiment the technology described herein is directed to use with floor registers, floor diffusers, baseboard grills, a window style air conditioning unit, and the like to filter out dust, mold spores and pet dander.

In yet another embodiment the technology described herein pertains to a window air filter sheet and door air filter sheet configured for sunlight shine-through. These embodiments are configured for the filtration of dust and pollen that occur during Spring, Summer and Fall. In one embodiment the air filter sheet is held by a clear plastic frame that is configured to attach to a window's insect screen. In other embodiments the air filter sheet and plastic frame assembly replaces the insect screen.

In another embodiment the air filter is comprised of paper pulp. The paper fiber is composed of a median-sized fiber to form the filtration sheet. The filtration pore is less than 1 micrometer in order to filter out bacteria, smog, and the like.

Based on an air force of 3400 CMH, <80 Pa test, there was a 92.5% filtration result. Due to environmental concerns, the filter sheet's thickness was increased to 1 mm so that it can stand alone without a metal net support.

An ASHRAE standard test confirmed a ASHRAE dust holding capacity of 95 g, supporting the ability of the air filter to filter out debris, lint, household dust, pollen, dust mites, mold spores, pet dander, smoke, smog, and the like.

Figure 9:
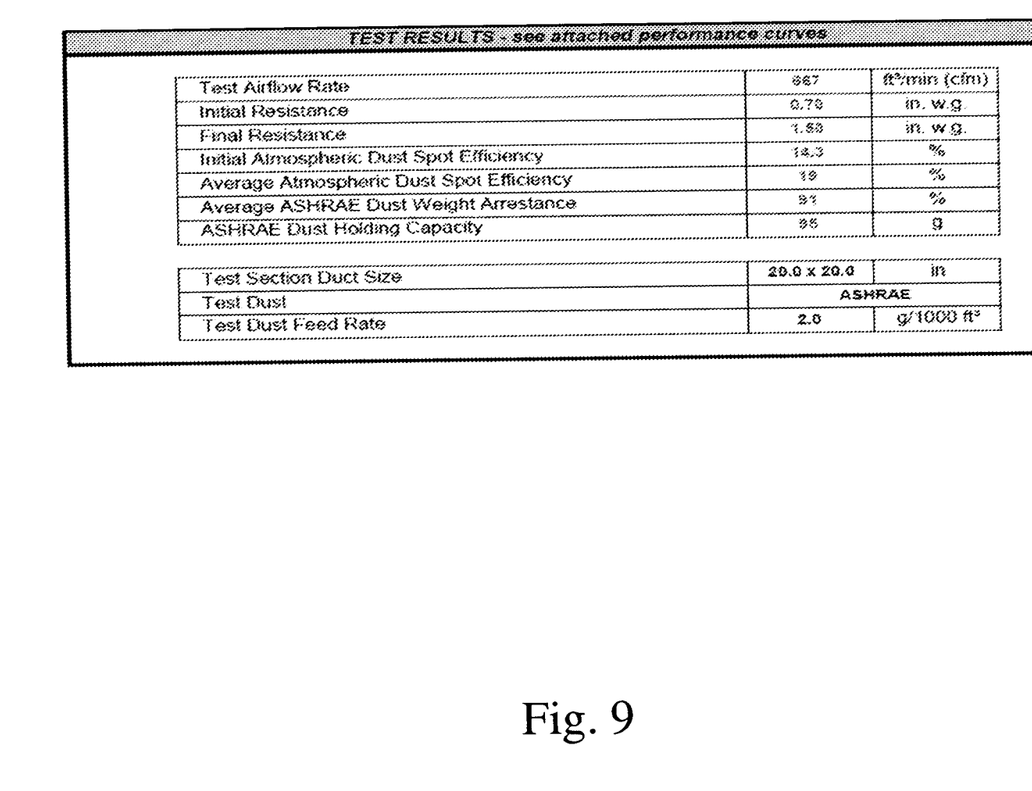
FIG. 9 illustrates ASHRAE standing test data points.
Figure 10:
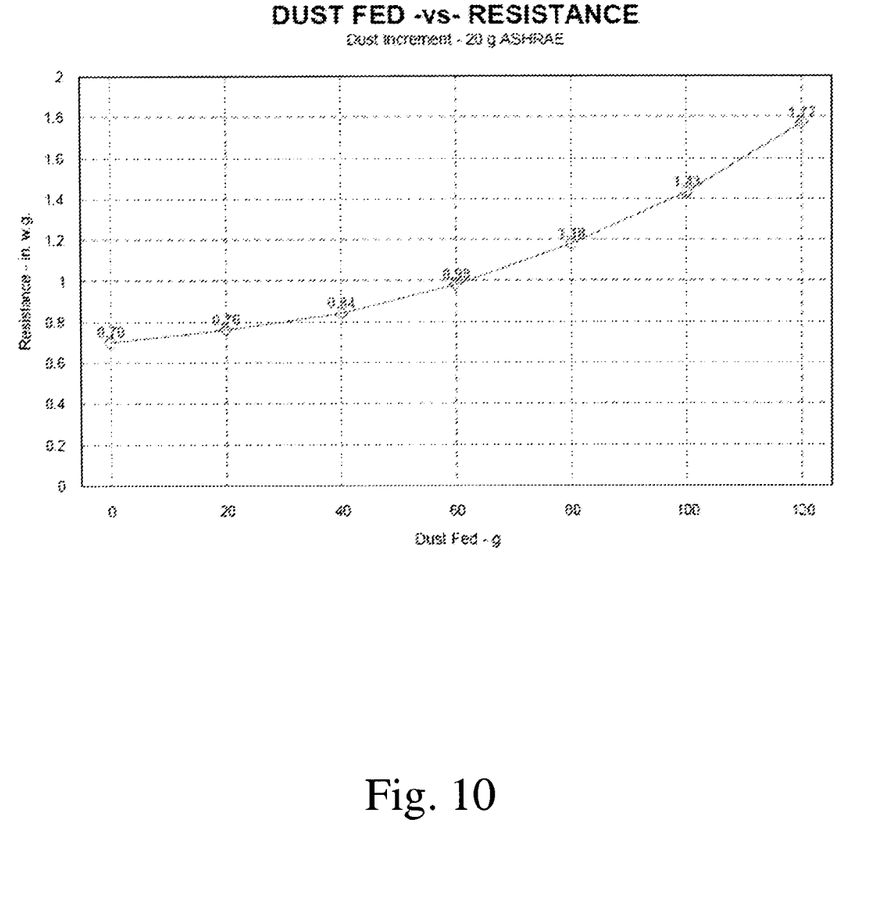
FIG. 10 illustrates an ASHRAE standing test results from Dust Fed vs. Resistance.

The tables depicted in FIGS. 9 and 10 show the test results.

In one embodiment an increased air flow capability filter sheet is configured to be thinner in thickness and to have larger filtration pores to facilitate air flow.

In another embodiment the filter sheet is configured to be semi-clear, e.g. translucent, tinted with a color and dimensioned to fit a window opening. This is similar to the traditional Chinese method of taping a thin paper with a design on a window as decorative art, but with the additional functionality of a window air filter to avoid the dust from getting into the room.

In yet another embodiment the technology described herein can be described as follows: a re-usable plastic or metal eco-safe air filter's case including hot zinc coated rust free metal net folder and sandwich designs for refill sheet; a holding paper fiber, or natural fibers such as: cotton, stalk of corn, stalk of wheat, jute, ramie, flax, cellulosic fibers, cardboard paper is framed on the two way air filter sheet making the whole eco-safe air filter 100% recyclable paper. The air filter sheet is created with paper pulp filtration capability, and can be used for air flow in both directions; wherein the sheet filter can be developed into more filtration capability sheet; more air flow capability sheet; sunlight shines through capability sheet for a window air filter; the air filter sheet with the semi-clear color is further attached to a porch door as an insect screen door air filter. Wherein is of a small piece of a single or multiple fragranced layer or pocket attach on the corner of the refill sheet allowing the re-fill sheet to serve as both an air filter and air freshener.

In yet another embodiment the technology described herein can be configured as a "do it yourself" kit comprising:
a. An Eco-safe semi-clear air filter sheet;
b. Clear plastic strips pre-cut 3 meters long;
c. Strips with clips attached every 1 ft. apart;
d. Strips with notches and insertions every 1 ft. apart;
e. Glue The air filter sheet and clear plastic strips are cut to a size desired by the user. The (b) and (c) strips have an array of teeth disposed on one side and configured for engaging the air filter sheet. The glue is used to attach the clear plastic strips on the air filter to form a pattern of squares. The (b) strip is attached at the top of the air filter sheet and the (c) strip is attached to the bottom of the air filter sheet.

Aspects of the technology described herein are to provide:
a. efficiency in filtration of unwanted airborne contaminants and allergens;
b. a higher quality of air in homes and offices;
c. air flow in either direction;
d. economy in production;
e. recyclability;
f. odor control capability;
g. air fresheners capability;
h. different levels of filtration, high air flow or high filtration ability; and
i. freshener treatment.

Furthermore, it is an aspect of the technology described herein to enable a user to customize the desired features.

There has thus been outlined, rather broadly, the features of the present invention in order that the detailed description that follows may be better understood, and in order that the present contribution to the art may be better appreciated. There are additional features of the invention that will be described and which will form the subject matter of the claims. Additional aspects and advantages of the present invention will be apparent from the following detailed description of an exemplary embodiment which is illustrated in the accompanying drawings. The invention is capable of other embodiments and of being practiced and carried out in various ways. Also, it is to be understood that the phraseology and terminology employed are for the purpose of description and should not be regarded as limiting.

BRIEF DESCRIPTION OF THE DRAWINGS

The technology described herein will be better understood by reading the detailed description of the invention with reference to the accompanying drawing figures, in which like reference numerals denote similar structure and refer to like elements throughout, and in which.

DETAILED DESCRIPTION OF THE INVENTION

In describing the preferred and other embodiments of the technology described herein, as illustrated in FIG. 1-8, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1-8, illustrated therein is an air filter assembly 010. The air filter assembly 010 is comprised of a frame assembly 100. The frame assembly 100 is further comprised of a first frame section 110 and a second frame section 120. Each frame is made of a durable material, e.g. metal or plastic, configured for reuse.

The air filter assembly 010 is further comprised of a recyclable air filter 200. The recyclable air filter 200 is configured to allow air flow from either direction, so there is no "right" or "wrong" way to insert the technology into air flow infrastructure, e.g. between the blower fan and the air delivery duct work. The recyclable air filter 200 is comprised of recyclable paper pulp filtration material configured for two-way filtration and to filter household dust, pollen, dust mites, mold spores, pet dander, smoke, smog, etc.

In some embodiments the recyclable filtration material is derived from plant fibers, e.g. corn stocks, cotton stalks, grain stalks, tree branches.

Figure 1:
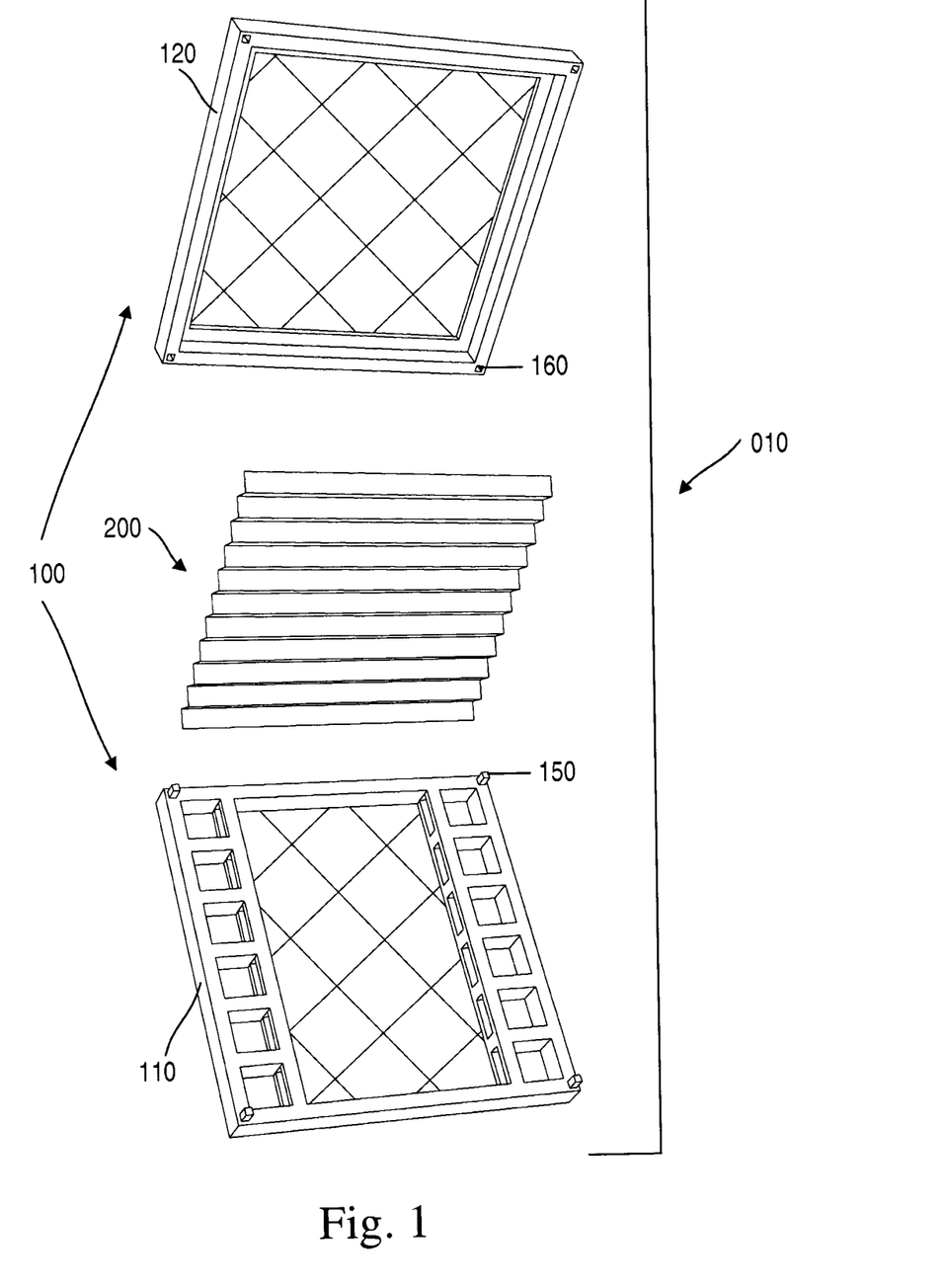
FIG. 1 illustrates an air filtration assembly, illustrating, in particular, an unassembled air filtration assembly having a recyclable air filter element and a two section frame assembly, according to an embodiment of the technology described herein.

In an exemplary embodiment each frame section is configured to snap-fit to its mating frame section, e.g. via male-female connections. The first frame section 110 has a plurality of a male snap fit projection 150. The second frame section 120 has a corresponding plurality of a female snap fit recess 160. In some embodiments the first frame section 110 and the second frame section 120 can have both male snap fit projections 150 and female snap fit recesses 160 that are configured to secure the first frame section 110 to the second frame section 120 with the recyclable air filter 200 sandwiched therebetween the two frame sections.

Either one or both frame sections can be further configured to have at least one internal fragrance retention area 300 configured for holding a correspondingly dimensioned fragrance container 400.

Figure 4:
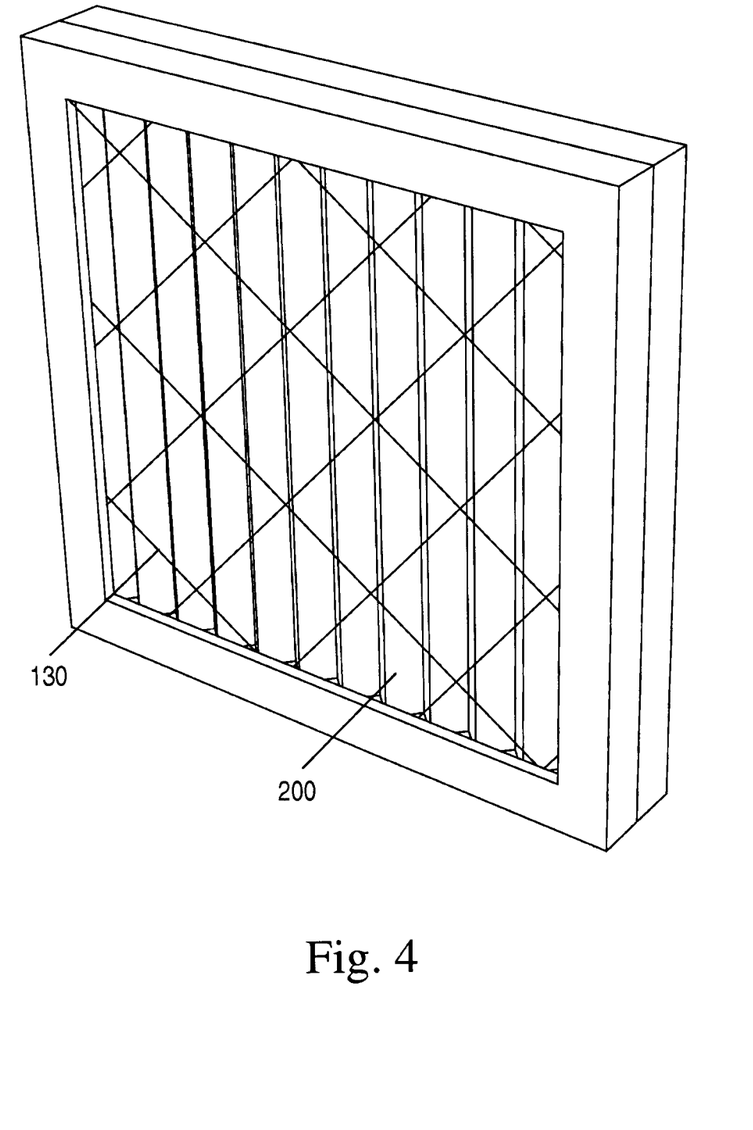
FIG. 4 illustrates an air filtration assembly, illustrating, in particular, an internal air filter retention lattice, according to an embodiment of the technology described herein.
Figure 5:
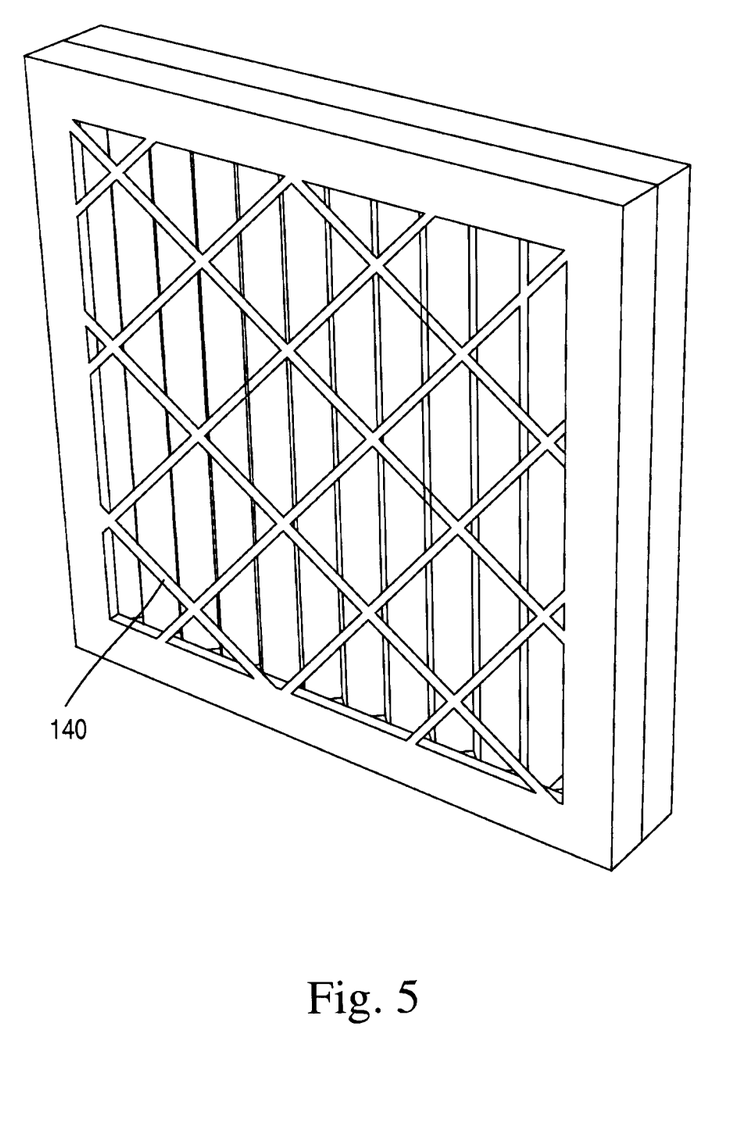
FIG. 5 illustrates an air filtration assembly, illustrating, in particular, an external air filter retention lattice, according to an embodiment of the technology described herein.
Figure 6:
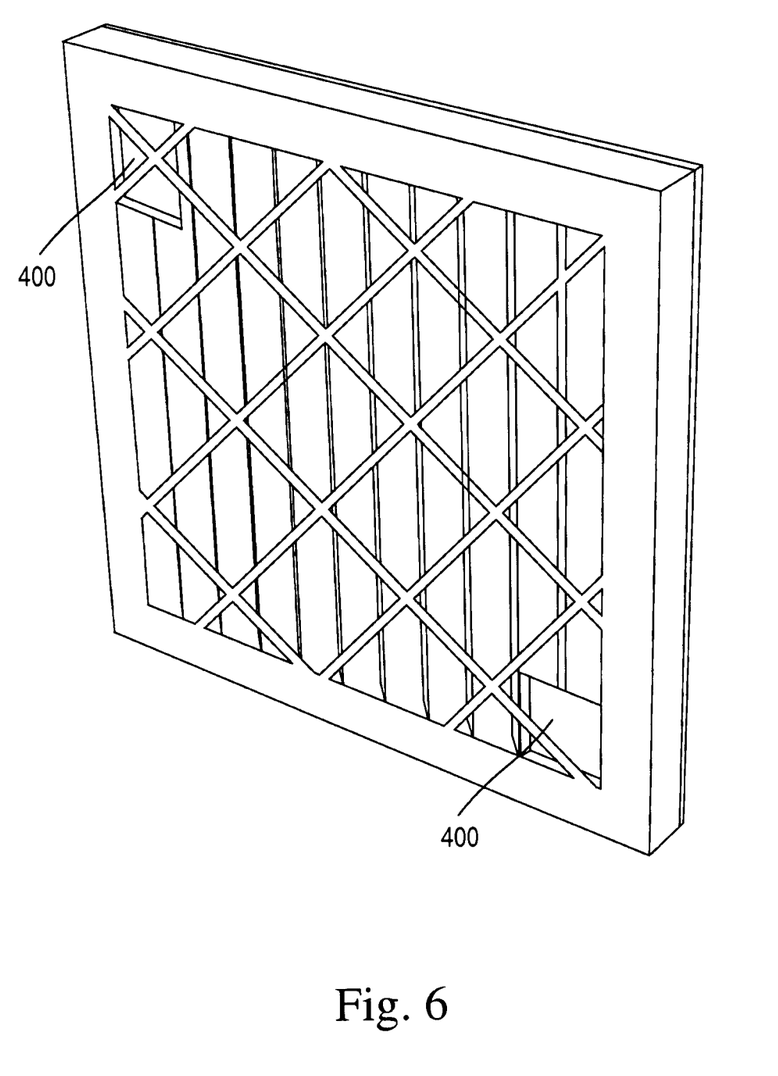
FIG. 6 illustrates an air filtration assembly, illustrating, in particular, an external air filter retention lattice and an upper fragrance recess and a lower fragrance recess, according to an embodiment of the technology described herein.
Figure 7:
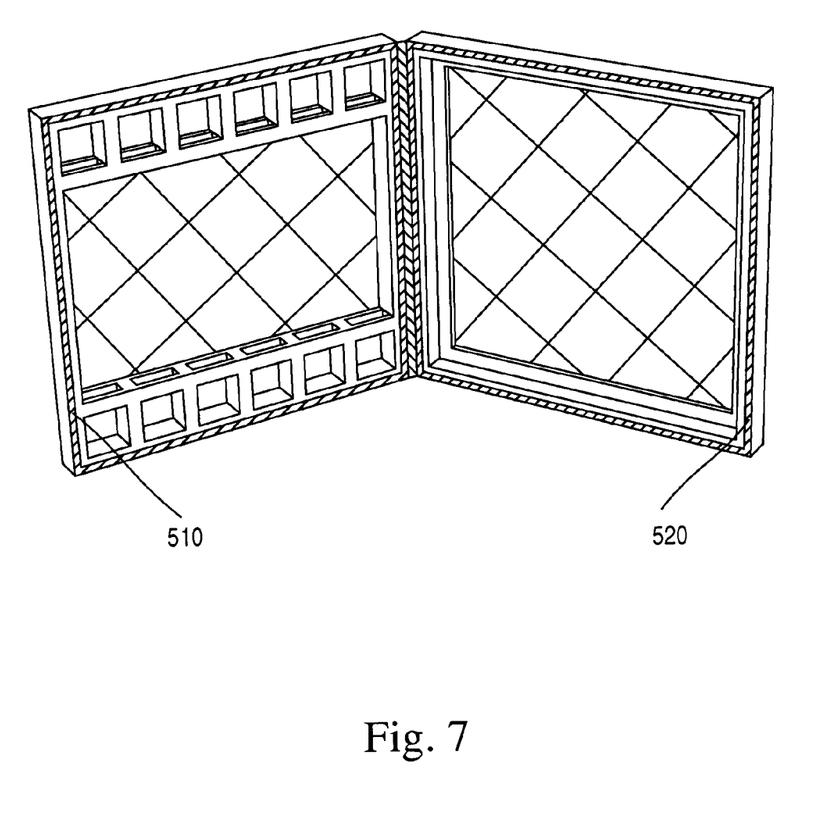
FIG. 7 illustrates an air filtration assembly, illustrating, in particular, the two section frame assembly connected by a hinge assembly and each section having a rubber edge disposed thereon as shown, according to an embodiment of the technology described herein.
Figure 8:
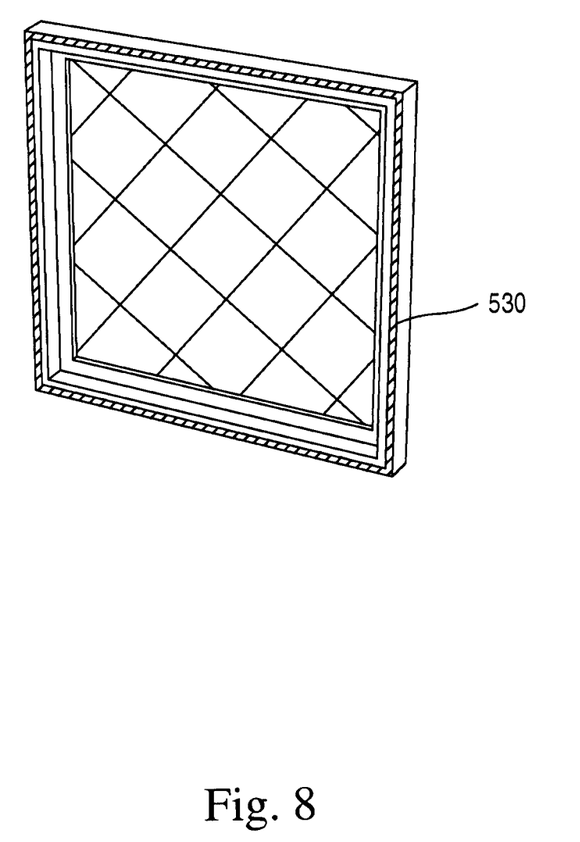
FIG. 8 illustrates the air filtration assembly of FIG. 7 in a closed position, illustrating, in particular a rubber band element holding the two sections closed.

Depending on the embodiment either an internal air filter retention lattice 130 or an external air filter retention lattice 140 can be used to hold the recyclable air filter 200 during air flow.

In one embodiment of the technology described herein one external air filter retention lattice 140 is integral with the exterior of the first frame section 110 and another external air filter retention lattice 140 is integral with the exterior of the second frame section 120.

In another embodiment of the technology described herein one external air filter retention lattice 140 is releasably attachable to the exterior of the first frame section 110 and another external air filter retention lattice 140 is releasably attachable to the exterior of the second frame section 120.

In one embodiment of the technology described herein one internal air filter retention lattice 130 is integral with the interior of the first frame section 110 and another internal air filter retention lattice 130 is integral with the interior of the second frame section 120.

In another embodiment of the technology described herein one internal air filter retention lattice 130 is releasably attachable to the interior of the first frame section 110 and another external air filter retention lattice 140 is releasably attachable to the exterior of the second frame section 120.

In one embodiment of the technology described herein one internal air filter retention lattice 130 is integral with the interior of the first frame section 110 and another external air filter retention lattice 140 is integral with the exterior of the second frame section 120.

In another embodiment of the technology described herein one internal air filter retention lattice 130 is releasably attachable to the interior of the first frame section 110 and another external air filter retention lattice 140 is releasably attachable to the exterior of the second frame section 120.

Figure 2:
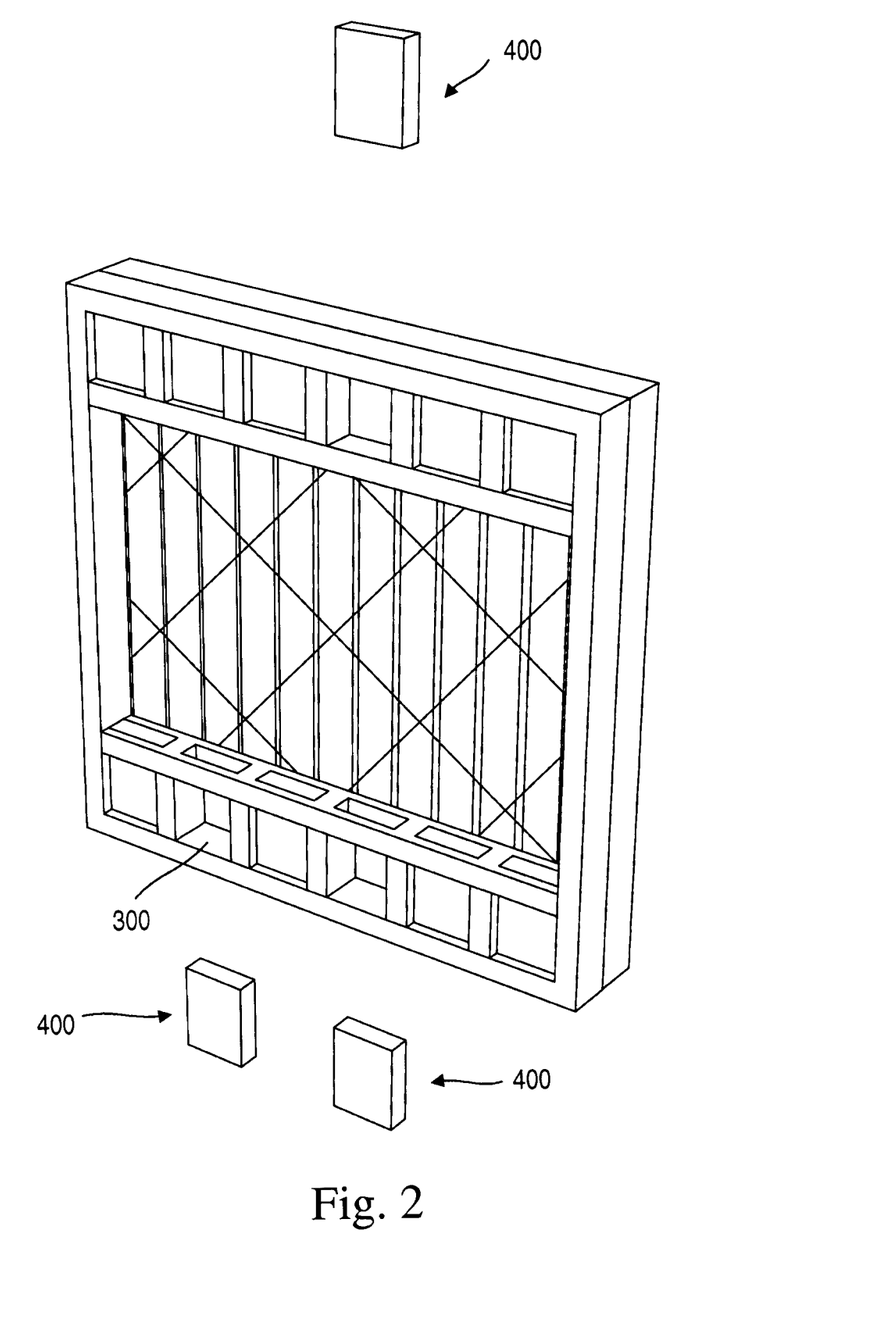
FIG. 2 illustrates an air filtration assembly, illustrating, in particular, an array of externally accessible air freshener recesses and air freshener containers, according to an embodiment of the technology described herein.
Figure 3:
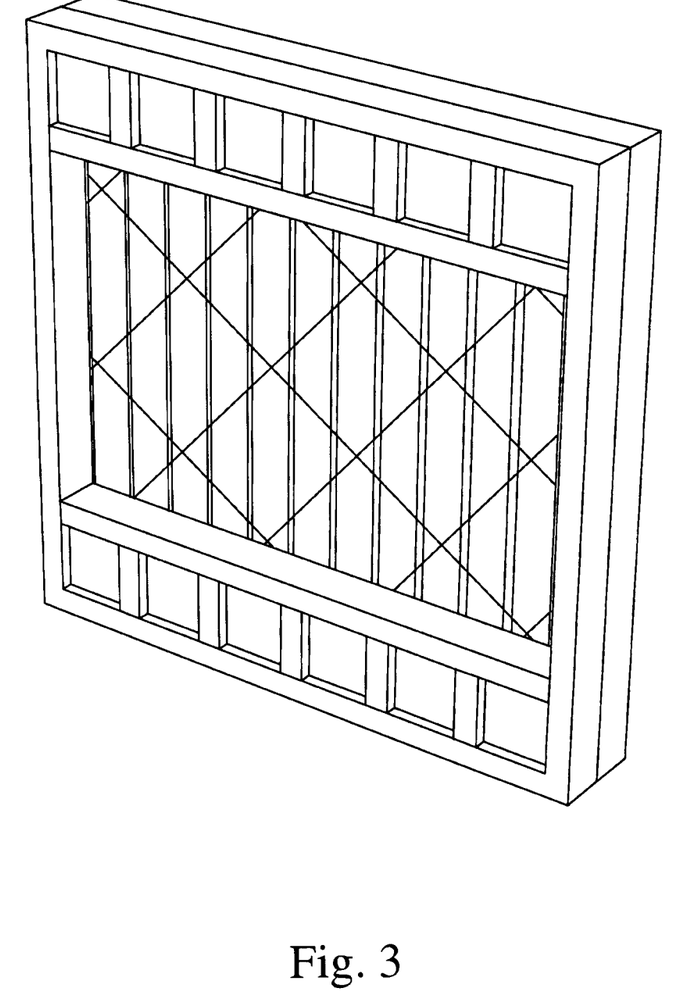
FIG. 3 illustrates an air filtration assembly, illustrating, in particular, an array of internally accessible air freshener recesses, according to an embodiment of the technology described herein.

In one embodiment of the technology described herein the at least one fragrance retention area 300 is an array of fragrance retention areas. This facilitates a user increasing the strength of fragrance by inserting the desired number of fragrance packages. The array also facilitates a user customizing a desired fragrance by placing different types of fragrances in the fragrance retention areas 300.

Depending on the embodiment, the first frame section 110 and the second frame section 120 can both be configured to have fragrance retention areas 300 disposed to be accessed internally, fragrance retention areas 300 disposed to be accessed externally, or a combination of fragrance retention areas 300 disposed to be accessed internally and externally.

Also in some embodiments, only the first frame section 110 or the second frame section 120 can have fragrance retention areas 300, with the remaining section having no fragrance retention areas 300.

In an exemplary embodiment, the technology described herein pertains to a filter system for filtering unwanted particles from a gas stream comprises: a first frame section, the first frame section having a first frame interior, a first frame exterior, a first perimeter and comprising: at least one first frame section fragrance retention recess disposed therein, the first frame section fragrance retention recess configured for internal access, a first frame section air filter retention lattice affixed thereon to the first frame interior, a plurality of a snap fit projection formed on the first perimeter, a first frame rubber edging disposed on the first perimeter; a second frame section, the second frame section having a second frame interior, a second frame exterior, a second perimeter and comprising: at least one second frame section fragrance retention recess disposed therein the second frame section fragrance retention recess configured for internal access, a second frame section air filter retention lattice affixed thereon to the second frame interior, a plurality of a snap fit recess formed on the second perimeter, the plurality of snap fit recess configured for releasable attachment to the plurality of snap fit projection, a second frame rubber edging disposed on the second perimeter; a recyclable air filter comprised of plant fibers and configured for placement between the first frame section and the second frame section, the recyclable air filter configured for filtration of dust, mold spores and pet dander from either a first direction of air flow or an opposing direction of air flow; at least one fragrance container containing a fragrance and configured for insertion into the at least one first frame section fragrance retention recess or the at least one second frame section fragrance retention recess; and a rubber elastic band configured for securing the first frame section to the second frame section by operably connecting the first frame rubber edging to the second frame rubber edging.

In another embodiment of the technology described herein a filter system for filtering unwanted particles from a gas stream comprises: a first frame section, the first frame section having a first frame interior, a first frame exterior, a first perimeter and comprising: at least one first frame section fragrance retention recess disposed therein, the first frame section fragrance retention recess configured for external access, a first frame section air filter retention lattice affixed thereon to the first frame interior, a plurality of a snap fit projection formed on the first perimeter, a first frame rubber edging disposed on the first perimeter; a second frame section, the second frame section having a second frame interior, a second frame exterior, a second perimeter and comprising: at least one second frame section fragrance retention recess disposed therein the second frame section fragrance retention recess configured for external access, a second frame section air filter retention lattice affixed thereon to the second frame interior, a plurality of a snap fit recess formed on the second perimeter, the plurality of snap fit recess configured for releasable attachment to the plurality of snap fit projection, a second frame rubber edging disposed on the second perimeter; a recyclable air filter comprised of plant fibers and configured for placement between the first frame section and the second frame section, the recyclable air filter configured for filtration of dust, mold spores and pet dander from either a first direction of air flow or an opposing direction of air flow; at least one fragrance container containing a fragrance and configured for insertion into the at least one first frame section fragrance retention recess or the at least one second frame section fragrance retention recess; and a rubber elastic band configured for securing the first frame section to the second frame section by operably connecting the first frame rubber edging to the second frame rubber edging.

In yet another embodiment of the technology described herein a filter system for filtering unwanted particles from a gas stream comprises: a first frame section, the first frame section having a first frame interior, a first frame exterior, a first perimeter and comprising: at least one first frame section fragrance retention recess disposed therein, the first frame section fragrance retention recess configured for internal access, a first frame section air filter retention lattice affixed thereon to the first frame interior, a plurality of a snap fit projection formed on the first perimeter, a first frame rubber edging disposed on the first perimeter; a second frame section, the second frame section having a second frame interior, a second frame exterior, a second perimeter and comprising: at least one second frame section fragrance retention recess disposed therein the second frame section fragrance retention recess configured for external access, a second frame section air filter retention lattice affixed thereon to the second frame interior, a plurality of a snap fit recess formed on the second perimeter, the plurality of snap fit recess configured for releasable attachment to the plurality of snap fit projection, a second frame rubber edging disposed on the second perimeter; a recyclable air filter comprised of plant fibers and configured for placement between the first frame section and the second frame section, the recyclable air filter configured for filtration of dust, mold spores and pet dander from either a first direction of air flow or an opposing direction of air flow; at least one fragrance container containing a fragrance and configured for insertion into the at least one first frame section fragrance retention recess or the at least one second frame section fragrance retention recess, the fragrance selected from the group consisting of fruits, nuts, seeds, grains, spices, flowers, vegetables, candies, desserts and combinations thereof; and a rubber elastic band 530 configured for securing the first frame section to the second frame section by operably connecting the first frame rubber edging 510 to the second frame rubber edging 520.

REFERENCE NUMBER TABLE

| Ref. # | Description |
| --- | --- |
| 010 | Air Filter Assembly |
| 100 | Frame Assembly |
| 110 | First Frame Section |
| 120 | Second Frame Section |
| 130 | Internal Air Filter Retention Lattice |
| 140 | External Air Filter Retention Lattice |
| 150 | Male Snap Fit Projection |
| 160 | Female Snap Fit Recess |
| 200 | Recyclable Air Filter |
| 300 | Fragrance Retention Area |
| 400 | Fragrance Container |
| 510 | First Frame Rubber Edging |
| 520 | Second Frame Rubber Edging |
| 530 | Rubber Elastic Band |

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosed technology and are intended to be covered in the appended claims.

I claim:

1. A filter system for filtering unwanted particles from a gas stream, the filter system comprising:
   a) a first frame section, the first frame section having a first frame interior, a first frame exterior, a first perimeter and comprising:
      i) at least one first frame section fragrance retention recess disposed therein, the first frame section fragrance retention recess configured for internal access,
      ii) a first frame section air filter retention lattice affixed thereon to the first frame interior,
      iii) a plurality of a snap fit projection formed on the first perimeter,
      iv) a first frame rubber edging disposed on the first perimeter;
   b) a second frame section, the second frame section having a second frame interior, a second frame exterior, a second perimeter and comprising:
      i) at least one second frame section fragrance retention recess disposed therein the second frame section fragrance retention recess configured for internal access,
      ii) a second frame section air filter retention lattice affixed thereon to the second frame interior,
      iii) a plurality of a snap fit recess formed on the second perimeter, the plurality of snap fit recess configured for releasable attachment to the plurality of snap fit projection,
      iv) a second frame rubber edging disposed on the second perimeter;
   c) a recyclable air filter comprised of plant fibers and configured for placement between the first frame section and the second frame section, the recyclable air filter configured for filtration of dust, mold spores and pet dander from either a first direction of air flow or an opposing direction of air flow;
   d) at least one fragrance container containing a fragrance and configured for insertion into the at least one first frame section fragrance retention recess or the at least one second frame section fragrance retention recess, the fragrance selected from the group consisting of fruits, nuts, seeds, grains, spices, flowers, vegetables, candies, desserts and combinations thereof; and
   e) a rubber elastic band configured for securing the first frame section to the second frame section by operably connecting the first frame rubber edging to the second frame rubber edging.

2. A filter system for filtering unwanted particles from a gas stream, the filter system comprising:
   a) a first frame section, the first frame section having a first frame interior, a first frame exterior, a first perimeter and comprising:
      i) at least one first frame section fragrance retention recess disposed therein, the first frame section fragrance retention recess configured for external access,
      ii) a first frame section air filter retention lattice affixed thereon to the first frame interior,
      iii) a plurality of a snap fit projection formed on the first perimeter,
      iv) a first frame rubber edging disposed on the first perimeter;
   b) a second frame section, the second frame section having a second frame interior, a second frame exterior, a second perimeter and comprising:
      i) at least one second frame section fragrance retention recess disposed therein the second frame section fragrance retention recess configured for external access,
      ii) a second frame section air filter retention lattice affixed thereon to the second frame interior,
      iii) a plurality of a snap fit recess formed on the second perimeter, the plurality of snap fit recess configured for releasable attachment to the plurality of snap fit projection,
      iv) a second frame rubber edging disposed on the second perimeter;
   c) a recyclable air filter comprised of plant fibers and configured for placement between the first frame section and the second frame section, the recyclable air filter configured for filtration of dust, mold spores and pet dander from either a first direction of air flow or an opposing direction of air flow;
   d) at least one fragrance container containing a fragrance and configured for insertion into the at least one first frame section fragrance retention recess or the at least one second frame section fragrance retention recess; and
   e) a rubber elastic band configured for securing the first frame section to the second frame section by operably connecting the first frame rubber edging to the second frame rubber edging.

3. A filter system for filtering unwanted particles from a gas stream, the filter system consisting of:
   a) a case filter system assembly;
   b) a folder filter system assembly;
   c) a sandwich filter system assembly;
   d) a kit filter system assembly; and
   e) a window filter system assembly, wherein each assembly is comprised of a recyclable air filter formed from the group consisting of paper pulp, cotton, stalk of corn, stalk of wheat, jute, ramie, flax, cellulosic fibers, and cardboard, and configured for filtration of household dust, pollen, dust mites, mold spores, pet dander, smoke, smog, and the like.

* * * * *